US012053989B2

(12) United States Patent
Mellin et al.

(10) Patent No.: US 12,053,989 B2
(45) **Date of Patent: *Aug. 6, 2024**

(54) INKJET PRINTING SYSTEM HAVING DYNAMICALLY CONTROLLED MENISCUS PRESSURE

(71) Applicant: The Boeing Company, Chicago, IL (US)

(72) Inventors: Matthew H. Mellin, Seattle, WA (US); Kjersta Lynn Larson-Smith, Seattle, WA (US); Edward Greene, Charleston, SC (US); Raj A. Desai, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,049

(22) Filed: Jul. 6, 2022

(65) Prior Publication Data

US 2022/0339947 A1 Oct. 27, 2022

Related U.S. Application Data

(63) Continuation of application No. 16/880,602, filed on May 21, 2020, now Pat. No. 11,413,877.

(51) Int. Cl.

| | |
|---|---|
| ***B41J 2/18*** | (2006.01) |
| ***B41J 2/07*** | (2006.01) |

(Continued)

(52) U.S. Cl.

CPC . *B41J 2/18* (2013.01); *B41J 2/07* (2013.01); *B41J 2/17556* (2013.01);

(Continued)

(58) Field of Classification Search

CPC ... B41J 2/18; B41J 2/07; B41J 2/17556; B41J 3/4073; B41J 2/17513; B41J 2/17566; B05B 12/085

See application file for complete search history.

(56) References Cited

U.S. PATENT DOCUMENTS

| | | | |
|---|---|---|---|
| 5,646,666 | A | 7/1997 | Cowger et al. |
| 5,848,859 | A | 12/1998 | Clark et al. |

(Continued)

FOREIGN PATENT DOCUMENTS

| | | | |
|---|---|---|---|
| EP | 2018970 | A2 | 1/2009 |
| EP | 2484528 | A1 | 8/2012 |

(Continued)

OTHER PUBLICATIONS

European Patent Office, Extended European Search Report Issued in Application No. 21168798.3, Oct. 8, 2021, Germany, 9 pages.

*Primary Examiner* — Geoffrey S Mruk

(74) *Attorney, Agent, or Firm* — Alleman Hall & Tuttle LLP

(57) ABSTRACT

Inkjet printing systems and methods dynamically control meniscus pressure at a nozzle to more reliably deliver ink to a substrate. The systems and methods include inferring an angle of a longitudinal axis of a printhead relative to the vertical reference axis based on an orientation signal from an orientation sensor, determining a target feed fluid pressure upstream of the nozzle and a target recirculation fluid pressure downstream of the nozzle, thereby to maintain a target pressure differentiation across the nozzle based, at least in part, on the inferred angle of the longitudinal axis, and controlling a variable feed pump speed and a variable recirculation pump speed to obtain the target feed fluid pressure and the target recirculation fluid pressure.

20 Claims, 5 Drawing Sheets

(51) Int. Cl.
*B41J 2/175* (2006.01)
*B41J 3/407* (2006.01)
*B05B 12/08* (2006.01)

(52) U.S. Cl.
CPC ........... *B41J 3/4073* (2013.01); *B05B 12/085* (2013.01); *B41J 2/17513* (2013.01); *B41J 2/17566* (2013.01)

(56) References Cited

U.S. PATENT DOCUMENTS

| | | | |
|---|---|---|---|
| 7,467,858 B2 | 12/2008 | Lebron et al. | |
| 8,192,000 B2 | 6/2012 | Coffey et al. | |
| 10,000,065 B1 | 6/2018 | Baker et al. | |
| 11,413,877 B2 * | 8/2022 | Mellin | B41J 2/17556 |
| 2005/0285886 A1 | 12/2005 | Okamoto | |
| 2008/0074468 A1 | 3/2008 | Silverbrook | |
| 2008/0198207 A1 | 8/2008 | Katada | |
| 2008/0231650 A1 | 9/2008 | Kojima et al. | |
| 2013/0271517 A1 | 10/2013 | Leoni et al. | |
| 2016/0009007 A1 | 1/2016 | Araki et al. | |

FOREIGN PATENT DOCUMENTS

| | | | |
|---|---|---|---|
| EP | 2484528 | A3 | 4/2013 |
| EP | 3363639 | A1 | 8/2018 |
| EP | 3415240 | A1 | 12/2018 |
| JP | 2003300332 | A | 10/2003 |

* cited by examiner

INKJET PRINTING SYSTEM HAVING DYNAMICALLY CONTROLLED MENISCUS PRESSURE

CROSS REFERENCE TO RELATED APPLICATIONS

This application is a continuation of U.S. patent application Ser. No. 16/880,602, filed May 21, 2020, the entirety of which is hereby incorporated herein by reference for all purposes.

FIELD

The present disclosure generally relates to inkjet printing and, more particularly, to dynamically controlling a fluid pressure present at a meniscus of a printhead nozzle.

BACKGROUND

An inkjet printing system is known that is capable of printing on complex, three-dimensional surfaces, where the orientation of the printhead changes during operation. This system dynamically controls a backpressure within the printhead to retain ink at a desired meniscus level within a nozzle. Using backpressure to supply ink to the nozzle, however, limits the rate at which ink can be supplied to the nozzle.

SUMMARY

In accordance with one aspect of the present disclosure, an inkjet printing system includes an ink supply, a printhead having a nozzle configured to discharge ink, the printhead defining a longitudinal axis and being supported for rotation in at least one degree of freedom relative to a vertical reference axis, a feed line fluidly coupled between the ink supply and the nozzle, and a recirculation line fluidly coupled between the nozzle and the ink supply independent of the feed line. A feed pump is disposed in the feed line and has a variable feed pump speed to generate a feed fluid pressure in the feed line between the feed pump and the nozzle, and a recirculation pump is disposed in the recirculation line and has a variable recirculation pump speed to generate a recirculation fluid pressure in the recirculation line between the recirculation pump and the nozzle. An orientation sensor determines an orientation of the longitudinal axis of the printhead and generates an orientation signal. A processor is operably coupled to the feed pump, the recirculation pump, and the orientation sensor, and is programmed to infer an angle of the longitudinal axis relative to the vertical reference axis based on the orientation signal from the orientation sensor, determine a target feed fluid pressure and a target recirculation fluid pressure to maintain a target pressure differentiation across the nozzle based, at least in part, on the inferred angle of the longitudinal axis, and control the variable feed pump speed and the variable recirculation pump speed to obtain the target feed fluid pressure and the target recirculation fluid pressure.

In accordance with another aspect of the present disclosure, an inkjet printing system includes an ink supply, a frame supported for rotation in at least one degree of freedom relative to a vertical reference axis, a printhead coupled to the frame and having a nozzle configured to discharge ink, the printhead defining a longitudinal axis, a feed line fluidly coupled between the ink supply and the nozzle and a recirculation line fluidly coupled between the nozzle and the ink supply independent of the feed line. A feed pump is disposed in the feed line and has a variable feed pump speed to generate a feed fluid pressure in the feed line between the feed pump and the nozzle, and a recirculation pump is disposed in the recirculation line and has a variable recirculation pump speed to generate a recirculation fluid pressure in the recirculation line between the recirculation pump and the nozzle. At least one pressure sensor is coupled to the frame and configured to generate a feed line pressure signal indicative of an actual feed line pressure and a recirculation line pressure signal indicative of an actual recirculation line pressure, and an orientation sensor is provided for determining an orientation of the longitudinal axis of the printhead and generating an orientation signal. A processor is operably coupled to the feed pump, the recirculation pump, the at least one pressure sensor, and the orientation sensor, and is programmed to infer an angle of the longitudinal axis relative to the vertical reference axis based on the orientation signal from the orientation sensor, determine a target feed fluid pressure and a target recirculation fluid pressure to maintain a target pressure differentiation across the nozzle based, at least in part, on the inferred angle of the longitudinal axis, and control the variable feed pump speed and the variable recirculation pump speed based on the feed line pressure signal and the recirculation line pressure signal, respectively, to obtain the target feed fluid pressure and the target recirculation fluid pressure.

In accordance with a further aspect of the present disclosure, a method of dynamically controlling ink flow through a nozzle of a printhead provided in an inkjet printing system includes determining an orientation of a longitudinal axis of the printhead based on an orientation signal from an orientation sensor, calculating an angle between the longitudinal axis of the printhead and a vertical reference axis, determining a target feed fluid pressure in a feed line supplying the nozzle and a target recirculation fluid pressure in a recirculation line returning from the nozzle to obtain a target pressure differentiation at the nozzle based, at least in part, on the orientation of the longitudinal axis, and controlling a variable feed pump speed of a feed pump provided in the feed line and a variable recirculation pump speed of a recirculation pump provided in the recirculation line to obtain the target feed fluid pressure and the target recirculation fluid pressure.

The features, functions, and advantages that have been discussed can be achieved independently in various embodiments or may be combined in yet other embodiments further details of which can be seen with reference to the following description and drawings.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 4:
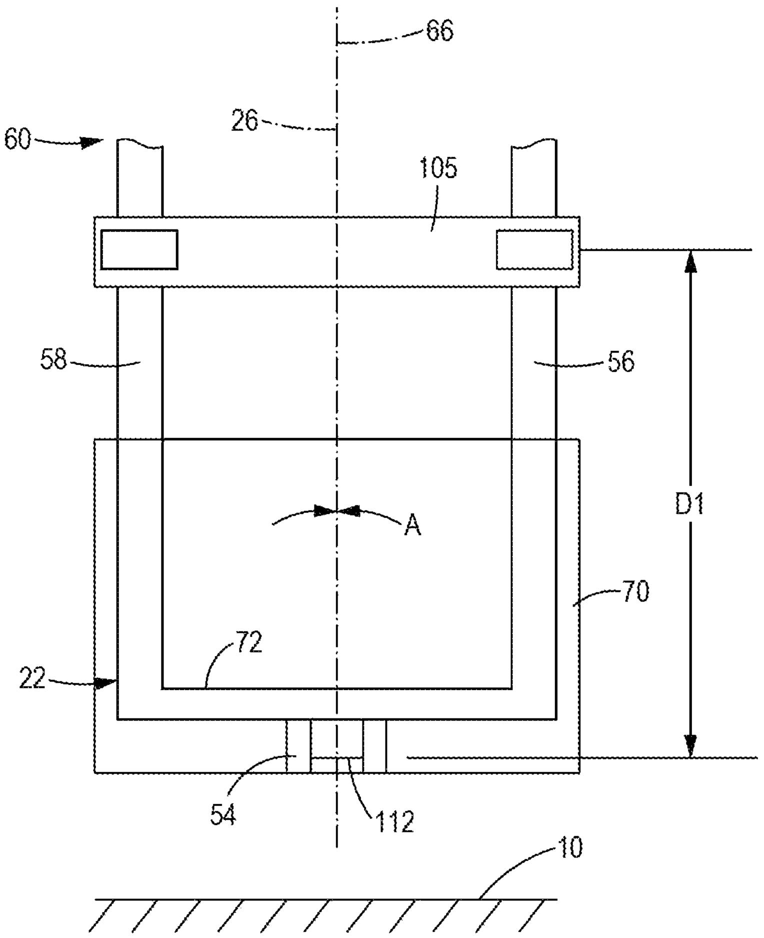
FIG. 4 is a schematic, front, plan view, in cross-section, of a printhead of the inkjet printing system of FIGS. 1-3, in a vertical position.
Figure 5:
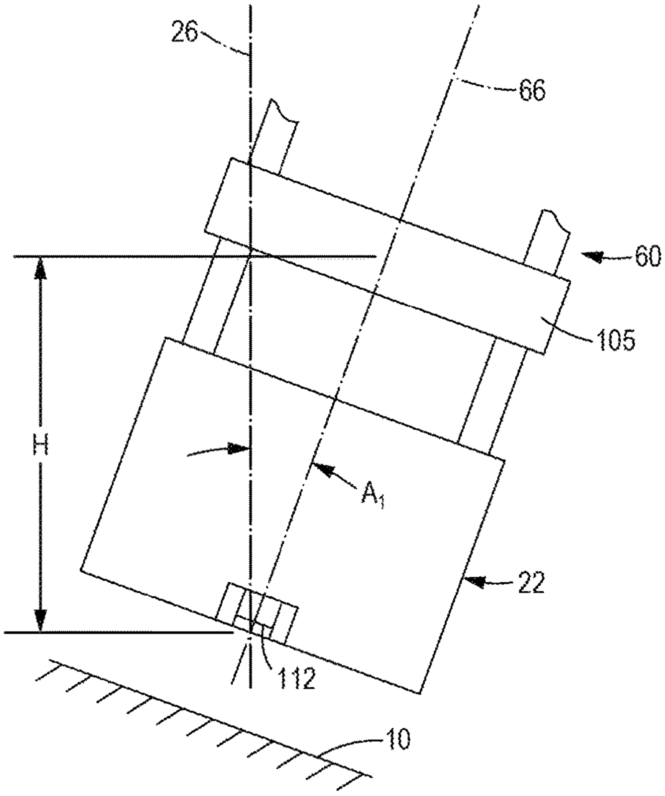
FIG. 5 is a schematic, front, plan view, in cross-section, of the printhead of FIG. 4 in a first rotated position.
Figure 6:
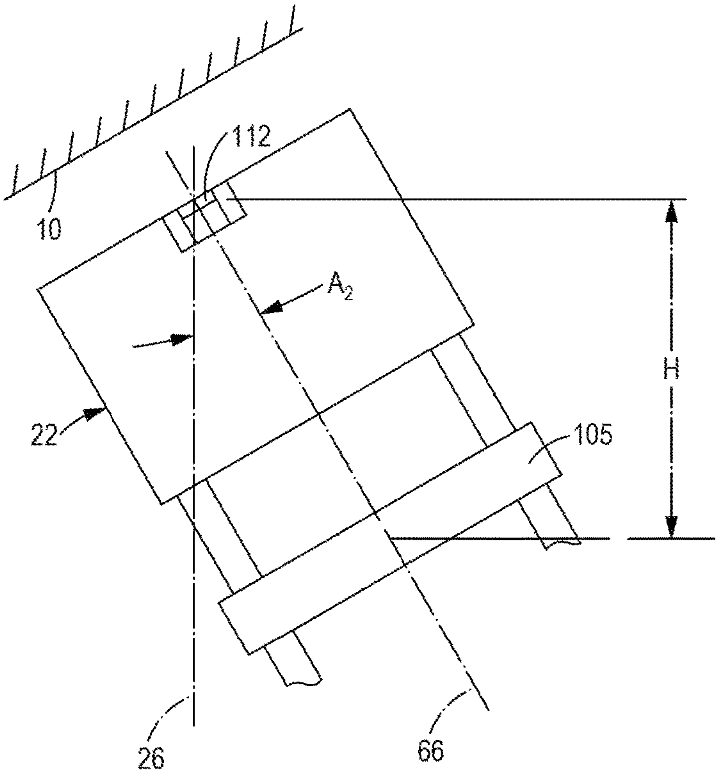
FIG. 6 is a schematic, front, plan view, in cross-section, of the printhead of FIGS. 4 and 5 in a second rotated position, in which a nozzle of the printhead is inverted.

Inkjet printing systems and methods are disclosed herein that are particularly suited for printing on complex, three dimensional surfaces, such as a surface 10 of an aircraft (FIGS. 4-6). The inkjet printing systems include a printhead having a nozzle from which ink is discharged. More specifically, the systems and methods disclosed herein dynamically manage both a feed fluid pressure upstream of the nozzle and a recirculation fluid pressure downstream of the nozzle based, at least in part, on an orientation of the printhead. The feed and recirculation flow rates are controlled so that a target fluid pressure is maintained at a meniscus of the nozzle, regardless of an orientation of the printhead.

Figure 1:
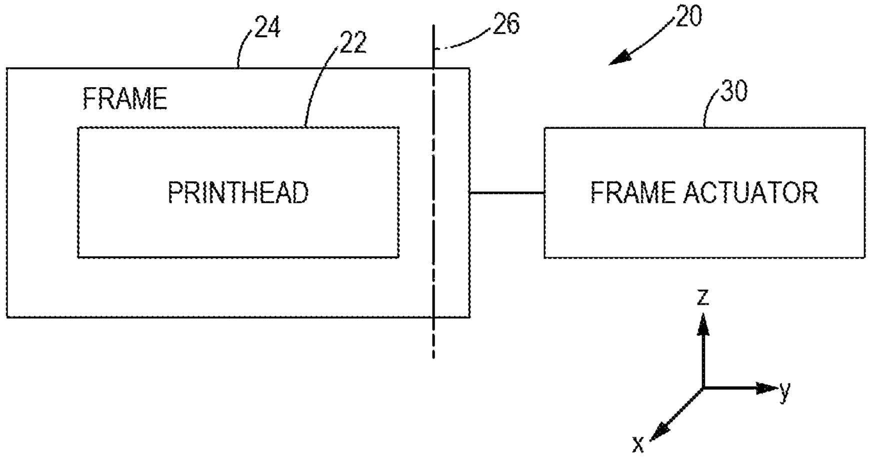
FIG. 1 is a schematic block diagram of an inkjet printing system according to the present disclosure.

Referring to FIG. 1, an inkjet printing system 20 includes a printhead 22 coupled to a frame 24. The frame 24 is supported for rotation in at least one degree of freedom relative to a vertical reference axis 26. In some embodiments, the frame is supported for rotation in three degrees of freedom, such as about orthogonal X, Y, and Z axes, and the vertical reference axis 26 may be parallel to the Z axis as illustrated in FIG. 1.

Figure 2:
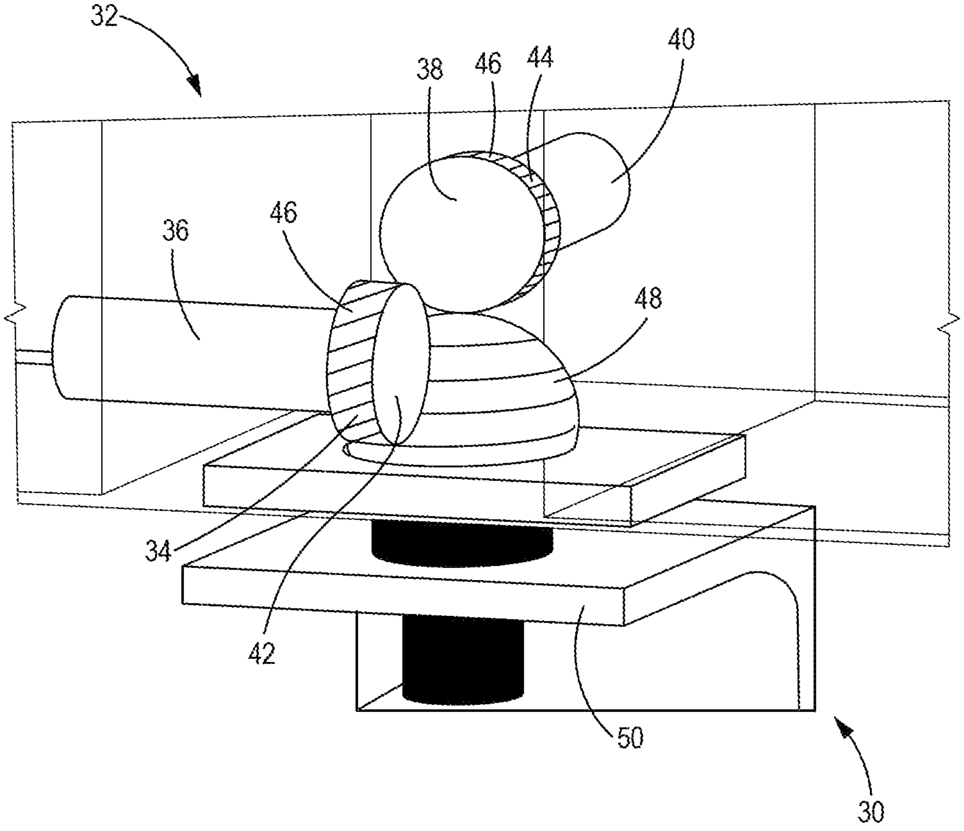
FIG. 2 is an enlarged perspective view of an exemplary actuator used in the inkjet printing system of FIG. 1.

The inkjet printing system 20 may further include a frame actuator 30 for actuating the frame 24 in the at least one degree of freedom relative to the vertical reference axis 26. For example, the exemplary frame actuator 30 illustrated at FIG. 2 operates to rotate the frame 24 about the X, Y, and Z axes. In this embodiment, the frame actuator 30 includes a micro-wheel actuation device 32 having multiple micro-actuation elements. For example, the micro-wheel actuation device 32 includes a first micro-wheel 34 rotatably coupled to a first electric motor 36, and a second micro-wheel 38 rotatably coupled to a second electric motor 40. The first and second electric motors 36, 40 independently drive the first and second micro-wheels 34, 38, respectively. It will be understood, however, that a fewer or greater number of micro-wheels and electric motors can be incorporated into the micro-wheel actuation device 32 as needed. In some embodiments, a circumference of the first micro-wheel 34 has a first wheel surface 42, and a circumference of the second micro-wheel 38 has a second wheel surface 44. Additionally, each of the first and second wheel surfaces 42, 44 include a wheel micro-texture 46 that engages with a micro-texturing on the surface of a gimbal 48. The frame 24 may include a frame base 50 that pivots and/or rotates about the gimbal 48, so that operating the first and second electric motors 36, 40, sequentially or simultaneously, will pivot the frame 24. While the frame actuator 30 is shown as a gimbal-style actuator in FIG. 2, it will be appreciated that other types of frame actuators, such as gear driven or robotic arms, may be used without departing from the scope of the appended claims. Additionally, while the illustrated frame actuator 30 provides movement in three axes, it will be appreciated that the frame actuator may be capable of movement in greater than or less than three axes.

Figure 3:
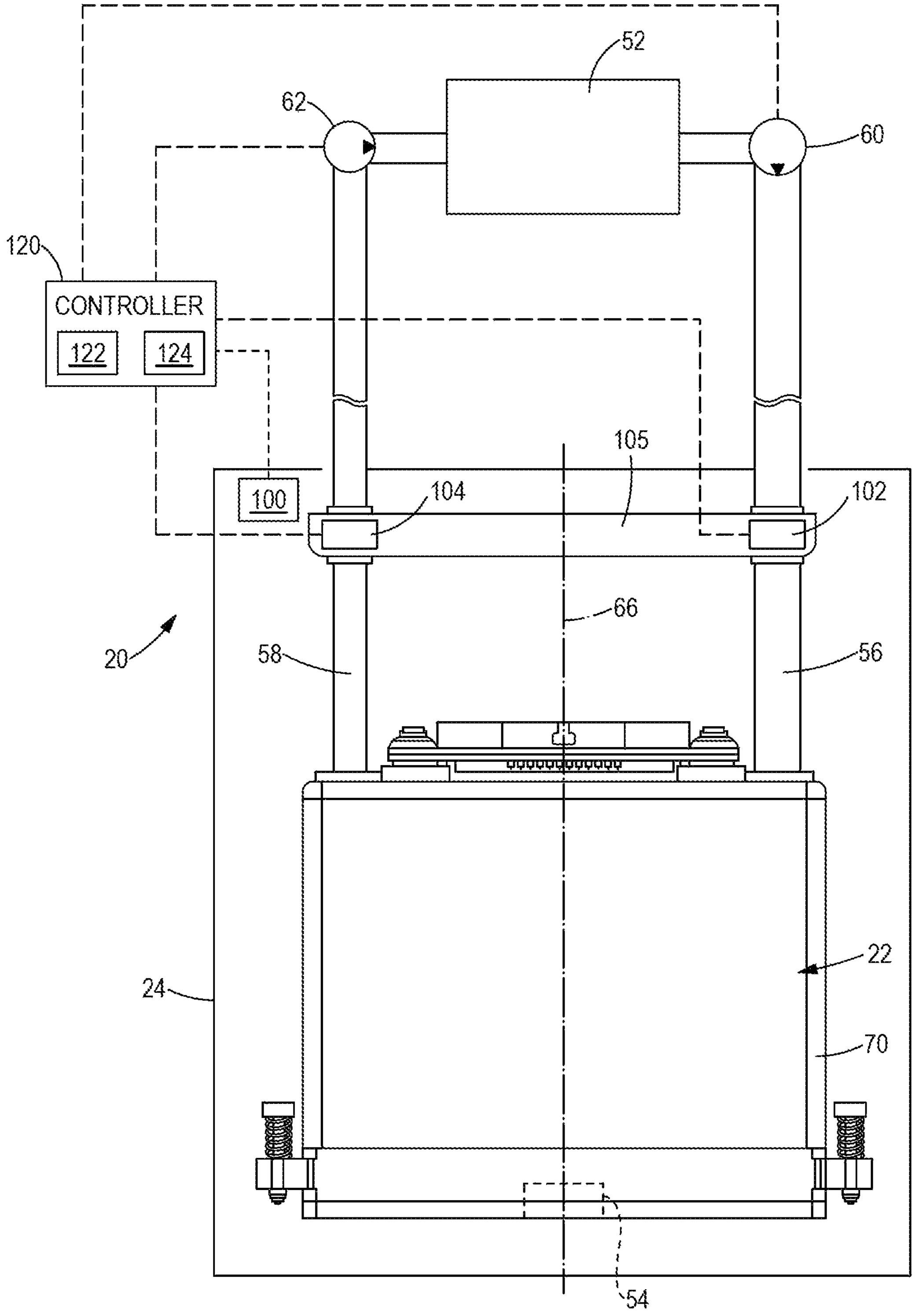
FIG. 3 is a front elevation view of the inkjet printing system of FIG. 1.

Referring to FIG. 3, the inkjet printing system 20 includes a bulk ink supply 52 for providing ink to a nozzle 54 of the printhead 22. More specifically, a feed line 56 fluidly couples the ink supply 52 to the nozzle 54, through which ink is supplied to the nozzle 54. A recirculation line 58 fluidly couples the nozzle 54 to the ink supply 52 independent of the feed line 56, through which ink is removed from the nozzle 54. A feed pump 60 is disposed in the feed line 56 and has a variable feed pump speed to generate a feed line fluid pressure in the feed line 56 between the feed pump 60 and the nozzle 54. Similarly, a recirculation pump 62 is disposed in the recirculation line 58 and has a variable recirculation pump speed to generate a recirculation fluid pressure in the recirculation line 58 between the recirculation pump 62 and the nozzle 54. Accordingly, it will be appreciated that the feed pump 60 and the recirculation pump 62 can be operated to generate a fluid pressure at the nozzle 54.

The printhead 22 is coupled to, and pivotable with, the frame 24. As best shown with reference to FIGS. 3-6, the printhead 22 generally includes a housing 70 that defines an internal ink passage 72. The internal ink passage 72 fluidly communicates between the nozzle 54 and each of the feed line 56 and the recirculation line 58. Additionally, the printhead 22 defines a longitudinal axis 66 that extends through the nozzle 54 and is indicative of an orientation of the nozzle 54.

An orientation sensor 100 is provided for determining an orientation of the printhead 22. In the exemplary embodiment shown in FIG. 3, the orientation sensor 100 is an accelerometer coupled to the frame 24. Alternatively, the orientation sensor 100 may be coupled to any structure that is mounted on the frame 24, such as the printhead 22. The accelerometer may determine an orientation of a reference associated with the printhead 22, such as the longitudinal axis 66, relative to a fixed reference frame, such as the vertical reference axis 26. In this embodiment, the orientation sensor 100 generates an orientation signal indicative of an angle between the longitudinal axis 66 and the vertical reference axis 26. Depending on the apparatus, the orientation feedback may be provided by a CNC machine based on a given position of an end effector at any time.

The inkjet printing system 20 further includes at least one pressure sensor for determining actual pressures of the ink upstream and downstream of the nozzle 54. In the example illustrated at FIG. 3, the at least one pressure sensor includes a feed pressure sensor 102 configured to generate a feed line pressure signal indicative of an actual pressure of the ink supplied to nozzle 54 through the feed line 56. The at least one pressure sensor further includes a recirculation pressure sensor 104 configured to generate a recirculation line pressure signal indicative of an actual pressure of the ink removed from the nozzle 54 through the recirculation line 58. The feed pressure sensor 102 and the recirculation pressure sensor 104 are housed in a pressure manifold 105.

In operation, the printhead 22 receives ink from the ink supply 52 and selectively discharges ink droplets from the nozzle 54 onto the surface 10. As best shown in FIGS. 4-6, the nozzle 54 defines a desired meniscus level 112 at which ink is present in the nozzle 54 to accurately discharge ink droplets. The desired meniscus level 112 has a position that is fixed relative to the pressure manifold 105 housing the feed pressure sensor 102 and the recirculation pressure sensor 104. For example, the desired meniscus level 112 of the nozzle 54 is spaced from the feed and recirculation pressure sensors 102, 104 along the longitudinal axis 66 by a distance D1.

The inkjet printing system 20 also includes a controller 120 for controlling operation of the printhead 22. More specifically, the controller 120 includes a processor 122 that may execute logic stored in data storage 124 to control the operations. The controller 120 is operably coupled to the feed pump 60, the recirculation pump 62, the orientation sensor 100, the feed pressure sensor 102, and the recirculation pressure sensor 104. The controller 120 may be representative of any kind of computing device or controller, or may be a portion of another apparatus as well, such as an apparatus included entirely within a server, and portions of the controller 120 may be elsewhere or located within other computing devices.

The processor 122 is programmed to dynamically control a pressure differential between the feed line pressure and the recirculation line pressure based, at least in part, on an orientation of the printhead 22. More specifically, the processor 122 may be programmed to infer an angle A of the longitudinal axis 66 relative to the vertical reference axis 26 based on the orientation signal from the orientation sensor 100 (FIGS. 4-6). Additionally, the processor 122 may determine a target feed pressure and a target recirculation pressure to maintain a target pressure differential at the nozzle 54 based, at least in part, on the inferred angle of the longitudinal axis. Still further, the processor 122 may control the variable feed pump speed and the variable recirculation pump speed to obtain the target feed pressure and the target recirculation pressure, thereby to provide the target pressure differential at the nozzle 54 regardless of the orientation of the printhead 22. In examples where the feed pressure sensor 102 and the recirculation pressure sensor 104 are provided, the processor is further programmed to control the variable feed pump speed and the variable recirculation pump speed based on the feed line pressure signal and the recirculation line pressure signal, respectively. In some examples, the target pressure differential is within a range of approximately +2 mbar to −2 mbar.

Additionally, the processor 122 may be programmed to calculate a head pressure adjustment to the target feed pressure and the target recirculation pressure. The head pressure adjustment is based on the distance D1 between the meniscus level 112 of the nozzle 54 and the feed and recirculation pressure sensors 102, 104 along the longitudinal axis 66 and the orientation of the printhead 22. With the distance D1 being predetermined and substantially fixed, and the angle of the longitudinal axis 66 being determined from the orientation sensor 100, the head pressure adjustment may be calculated using simple trigonometry.

It will be appreciated that the head pressure adjustment will change according to the orientation of the printhead 22. More specifically, the cosine of angle A is equal to the head pressure adjustment divided by the distance D1. Stated another way, the head pressure adjustment is equal to the product of the distance D1 and the cosine of angle A. Thus, when the printhead 22 is oriented so that the longitudinal axis 66 is vertical, the angle A is zero and the cosine of zero is 1, and therefore the head pressure adjustment is equal to the distance D1. When the printhead 22 is rotated to an angle A1, as shown in FIG. 5, then the head pressure adjustment is equal to the distance D1 multiplied by the cosine of the angle A1. If the angle A1 is 20° and the distance D1 is 2 inches, for example, the head pressure adjustment is 1.88 inches water column. This head pressure adjustment would then be applied to preliminary feed and recirculation pressure calculations to arrive at the target feed pressure and the target recirculation pressure.

Furthermore, it is noted that when the printhead 22 is inverted to angle A2, as shown in FIG. 6, the head pressure adjustment will have a negative value. Accordingly, the head pressure adjustment for an inverted printhead 22 would require the preliminary feed and recirculation pressure calculations to be increased to obtain the target feed and recirculation pressures.

Figure 7:
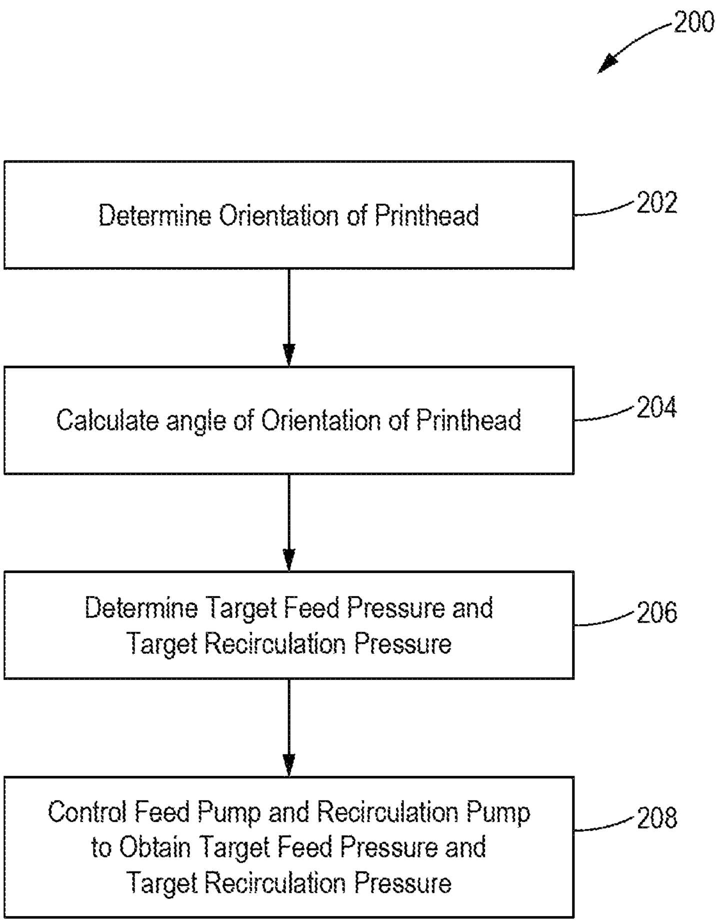
FIG. 7 is a block diagram illustrating a method of dynamically controlling feed fluid flow rate and a recirculation fluid flow rate through a nozzle of a printhead provided in an inkjet printing system.

FIG. 7 is a flowchart illustrating an exemplary method 200 of dynamically controlling feed and recirculation pressures through the printhead 22. The method 200 begins at block 202 by determining an orientation of a longitudinal axis 66 of the printhead 22 based on an orientation signal from an orientation sensor 100. At block 204, the method 200 continues by calculating an angle between the longitudinal axis 66 of the printhead 22 and a vertical reference axis 26. At block 206, a target feed pressure of ink supplied to the nozzle 54 and a target recirculation pressure of ink removed from the nozzle 54 are determined to obtain a target pressure differential at the nozzle 54 based, at least in part, on the inferred angle of the longitudinal axis 66. At block 208, the method 200 includes controlling a variable feed pump speed of a feed pump provided in a feed line supplying the nozzle 54 and a variable recirculation pump speed of a recirculation pump provided in a recirculation line returning from the nozzle 54 to obtain the target feed pressure and the target recirculation pressure.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure. Various modifications, as are suited to the particular use, are contemplated.

What is claimed is:

1. A method of dynamically controlling ink flow through a nozzle of a printhead provided in an inkjet printing system, the method comprising:

- determining an orientation of a longitudinal axis of the printhead based on an orientation signal from an orientation sensor;
- calculating an angle between the longitudinal axis of the printhead and a vertical reference axis;
- determining a target feed fluid pressure in a feed line supplying the nozzle and a target recirculation fluid pressure in a recirculation line returning from the nozzle to obtain a target pressure differential at the nozzle based, at least in part, on the orientation of the longitudinal axis; and
- controlling a variable feed pump speed of a feed pump provided in the feed line and a variable recirculation pump speed of a recirculation pump provided in the recirculation line to obtain the target feed fluid pressure and the target recirculation fluid pressure, wherein the orientation sensor is configured as an accelerometer mounted to a frame of the inkjet printing system.

2. The method of claim 1, wherein at least one pressure sensor is provided to generate a feed line pressure signal indicative of an actual feed line pressure and a recirculation line pressure signal indicative of an actual recirculation line pressure; and controlling the variable feed pump speed and the variable recirculation pump speed is based on the feed line pressure signal and the recirculation line pressure signal, respectively.

3. The method of claim 2, wherein the at least one pressure sensor is housed in a pressure manifold.

4. The method of claim 2, wherein the nozzle defines a desired meniscus level at which ink is held in the nozzle, the desired meniscus level of the nozzle being spaced from the at least one pressure sensor along the longitudinal axis of the printhead by a distance; and determining the target feed fluid pressure and the target recirculation fluid pressure further comprises:

calculating a head pressure based on the orientation of the longitudinal axis and the distance; and adjusting the target feed fluid pressure and the target recirculation fluid pressure based on the head pressure.

5. The method of claim 4, wherein the desired meniscus level has a position that is fixed relative to a pressure manifold housing the at least one pressure sensor.

6. The method of claim 4, wherein the at least one pressure sensor includes a feed pressure sensor and a recirculation pressure sensor; and the desired meniscus level is spaced from the feed pressure sensor and the recirculation pressure sensor along the longitudinal axis by a predetermined distance.

7. The method of claim 4, wherein the calculation of the head pressure is adjusted based on the distance between the desired meniscus level and the at least one pressure sensor along the longitudinal axis and the orientation of the printhead as the orientation changes.

8. The method of claim 7, wherein when the printhead is oriented so that the longitudinal axis is vertical, the head pressure adjustment is equal to the distance.

9. The method of claim 8, wherein the orientation sensor is configured as an accelerometer mounted to the printhead.

10. The method of claim 1, wherein the orientation sensor is configured as an accelerometer mounted to the printhead.

11. The method of claim 1, further comprising providing orientation feedback via a computer numerical control machine.

12. The method of claim 1, wherein the target pressure differential is within a range of +2 mbar to −2 mbar.

13. The method of claim 1, wherein the feed pump and the recirculation pump are controlled to maintain a meniscus level at the nozzle regardless of the orientation of the printhead.

14. The method of claim 1, further comprising configuring the orientation sensor to detect orientations of the printhead in multiple axes relative to the vertical reference axis.

15. The method of claim 1, further comprising obtaining the target pressure differential based on an inferred angle of the longitudinal axis.

16. A method of dynamically controlling ink flow through a nozzle of a printhead provided in an inkjet printing system, the method comprising:

determining an orientation of a longitudinal axis of the printhead based on an orientation signal from an orientation sensor;

calculating an angle between the longitudinal axis of the printhead and a vertical reference axis;

determining a target feed fluid pressure in a feed line supplying the nozzle and a target recirculation fluid pressure in a recirculation line returning from the nozzle to obtain a target pressure differential at the nozzle based, at least in part, on the orientation of the longitudinal axis; and controlling a variable feed pump speed of a feed pump provided in the feed line and a variable recirculation pump speed of a recirculation pump provided in the recirculation line to obtain the target feed fluid pressure and the target recirculation fluid pressure, wherein the orientation sensor is configured as an accelerometer mounted to a frame of the inkjet printing system, and the target pressure differential is within a range of +2 mbar to −2 mbar.

17. The method of claim 16, wherein at least one pressure sensor is provided to generate a feed line pressure signal indicative of an actual feed line pressure and a recirculation line pressure signal indicative of an actual recirculation line pressure; and controlling the variable feed pump speed and the variable recirculation pump speed is based on the feed line pressure signal and the recirculation line pressure signal, respectively.

18. The method of claim 16, wherein the at least one pressure sensor is housed in a pressure manifold.

19. The method of claim 18, wherein the desired meniscus level has a position that is fixed relative to a pressure manifold housing the at least one pressure sensor.

20. The method of claim 16, wherein the nozzle defines a desired meniscus level at which ink is held in the nozzle, the desired meniscus level of the nozzle being spaced from the at least one pressure sensor along the longitudinal axis of the printhead by a distance; and determining the target feed fluid pressure and the target recirculation fluid pressure further comprises:

calculating a head pressure based on the orientation of the longitudinal axis and the distance; and adjusting the target feed fluid pressure and the target recirculation fluid pressure based on the head pressure.

* * * * *